United States Patent Office 3,728,339
Patented Apr. 17, 1973

3,728,339
STYRYL COMPOUNDS
Klaus-Dieter Bode and Josef Schroeder, Leverkusen, and Carl-Wolfgang Schellhammer, Opladen, Germany, assignors to Farbenfabriken Bayer Aktiengesellschaft, Leverkusen, Germany
No Drawing. Filed Oct. 22, 1970, Ser. No. 83,237
Claims priority, application Germany, Nov. 3, 1969, P 19 55 066.4
Int. Cl. C09b 23/14
U.S. Cl. 260—240 D    6 Claims

ABSTRACT OF THE DISCLOSURE

Styryl compounds of the formula in which $R_1$ represents hydrogen, halogen, alkyl, alkenyl, alkoxy or aryl radicals, and $R_2$, $R_3$ and $R_4$ denote hydrogen, halogen, alkyl, alkoxy, cycloalkyl, aralkyl or aryl radicals or the nitrile group, and $R_2$ and $R_3$ can conjointly form a six-membered aromatic ring, as well as their preparation and their use as optical brightening.

---

The subject of the present invention are oxazolylstyryl-benztriazoles of general formula in which $R_1$ represents hydrogen, halogen, alkyl, alkenyl, alkoxy or aryl radicals, and $R_2$, $R_3$ and $R_4$ independently of one another denote hydrogen, halogen, alkyl, alkoxy, cycloalkyl, aralkyl, or aryl radicals or the nitrile group, and $R_2$ and $R_3$ can conjointly form a six-membered aromatic ring, as well as their manufacture and use as optical brighteners.

The radical $R_1$ preferably represents hydrogen, halogen, such as chlorine and bromine, alkyl, alkenyl and alkoxy radicals with 1 to 4 C atoms each as well as the phenyl radical.

Suitable substituents $R_2$, $R_3$ and $R_4$ are preferably hydrogen, halogen, such as chlorine and bromine, alkyl, alkenyl and alkoxy radicals with 1 to 4 C atoms each, cycloalkyl radicals with 5 to 6 C atoms, phenylalkyl radicals with 1 to 4 C atoms in the alkyl radical and the phenyl radical. Valuable compounds of Formula I are furthermore those in which $R_2$ and $R_3$ conjointly with the benzene ring fused to the oxazole ring form a naphthalene ring.

As particularly preferred styryl compounds of Formula I, those listed in the following table may for example be mentioned:

| $R_1$ | $R_2$ | $R_3$ | $R_4$ |
|---|---|---|---|
| H | H | $CH_3$ | H |
| H | H | H | $CH_3$ |
| H | H | (phenyl ring) | H |
| H | H | (phenyl)-$CH_2$- | H |
| H | H | (phenyl)-C($CH_3$)$_2$- | H |
| H | H | t-$C_4H_9$ | H |
| H | —CH=CH— | —CH=CH— | H |
| Cl | H | $CH_3$ | H |
| H | H | $CH_3$ | $CH_3$ |
| $OCH_3$ | H | $CH_3$ | $CH_3$ |
| H | H | (cyclohexyl H) | $CH_3$ |
| H | H | (cyclopentyl H) | $CH_3$ |

Note.—The radical represents:

The styryl compounds (I) according to the invention can be manufactured according to various processes. The new compounds are obtained in a particularly advantageous manner if β-(benztriazolyl-2′)-styrene-4-carboxylic acids or -carboxylic acid derivatives of general formula

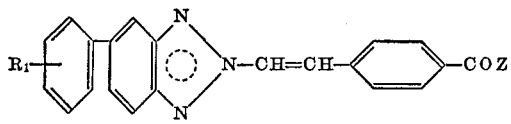

(II)     (Z=OH)
(IIa)    (Z=halogen)
(IIIb)   (Z=alkoxy)

in which $R_1$ has the abovementioned significance, are reacted with o-aminophenols of general formula

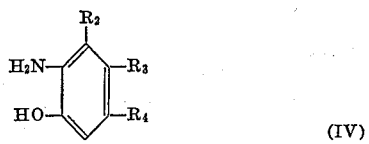

(IV)

in which $R_2$, $R_3$ and $R_4$ have the abovementioned significance, at elevated temperatures, optionally in the presence of an inert solvent and of an acid acceptor, and the reaction product—preferably without being isolated—is cyclised with dehydrating agents, it being possible, in detail, for various reaction paths to be followed.

In general the advisable procedure (method A) is that in a first stage β-(benztriazolyl-2′)-styrene-4-carboxylic acids (II) are converted in the customary manner into the corresponding acid halide (III) which it is not essential to isolate and that this is reacted with an o-aminophenol (IV) in an inert solvent, in the presence of a base, to give an amide (V) which it is not essential to isolate, and that this is cyclised in the presence of catalytic amounts of dehydrating agents, at elevated temperatures, to give the corresponding benzoxazole (I).

Another possible synthesis (method B) for the compounds (I) according to the invention consists of reacting a benztriazolylstyroylcarboxylic acid halide (III) in an inert solvent with o-aminophenols (IV) in the absence of an acid acceptor to give the corresponding o-aminoester hydrochloride (VI) and cyclising this—optionally after isolating it—in a suitable solvent by means of dehydrating agents.

In a third process (method C) the advantageous procedure is that in a single-pot reaction, a benztriazolylstyryl carboxylic acid (II) or its functional derivative (IIIa, b), in a 5-fold to 10-fold amount of polyphosphoric acid, which preferably contains about 85% of $P_2O_5$, is stirred with o-aminophenols (IV) for 4 to 12 hours at elevated temperatures—preferably at 110–190° C.—and the reaction mixture is introduced into water.

The benztriazolestyrenecarboxylic acids (II) used as starting materials can be manufactured in a manner which is in itself known by reacting suitable benztriazoles with sodium chloracetate and isolating the corresponding benztriazolyl-2-acetic acids (VII) from the isomer mixture thereby produced in a known manner (A. 515, (1935)) by means of concentrated hydrochloric acid.

Suitable benztriazoles are:

5-phenyl-benztriazole,
5-(4′-chlorophenyl)-benztriazole,
5-(2′-methylphenyl)-benztriazole,
5-(4′-t-butylphenyl)-benztriazole,
5-(4′-methoxyphenyl)-benztriazole,
5-(4′-ethoxyphenyl)-benztriazole and
5-(4′-diphenyl)-benztriazole.

Suitable o-aminophenols are:

2-aminophenol,
5-methyl-2-aminophenol,
6-methyl-2-aminophenol,
5-tert.-butyl-2-aminophenol,
5-tert.-amyl-2-aminophenol,
5-α,α-dimethylbenzyl-2-aminophenol,
5-cyclohexyl-2-aminophenol,
5-chloro-2-aminophenol,
5-methoxy-2-aminophenol,
4-hydroxy-5-amino-biphenol and
1-amino-2-naphthol.

Suitable inert solvents for the manufacture of the o-hydroxyamides (V) and o-aminoesters (VI) are toluene, xylene, chlorobenzene, o-dichlorobenzene and glycol monomethyl ether. Suitable acid acceptors are pyridine, picoline, collidine, triethylamine dimethylaniline and others.

Suitable dehydrating agents are boric acid, zinc chloride, zinc acetate, 4-toluenesulphonic acid, phosphorus pentoxide and polyphosphoric acid. Mixtures of tin-(II) chloride and concentrated hydrochloric acid in glycol monomethyl ether are above all suitable for the cyclisation of the o-aminoesters (VI).

The temperatures at which the formation of the o-hydroxyamides (V) and o-aminoesters (VI) takes place can be varied over a substantial range. In general temperatures of between 0 and 180° C., preferably between 25 and 110° C., are used. The cyclisation temperatures are preferably between 110 and 190° C.

In the reaction of the o-aminophenols (IV) with the benztriazolylstyrylcarboxylic acids or their derivatives (II and III) approximately equimolar amounts are preferably used; a 5 to 10% excess of (IV) is optionally also used.

According to a further process which differs from the synthesis principles described above, the new styryl compounds are obtained if 5-arylbenztriazolylacetic acids of formula

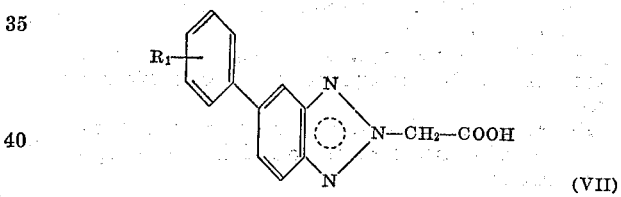

(VII)

in which $R_1$ has the significance indicated in col 1, are condensed in the presence of condensation catalysts with 2-(4′-formylphenyl)-benzoxazoles of formula

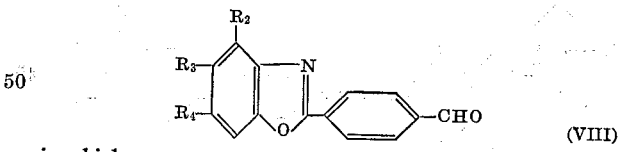

(VIII)

in which $R_2$, $R_3$ and $R_4$ have the significance indicated for Formula I,
with dehydration and decarboxylation taking place.

Suitable condensation agents are especially secondary and tertiary bases such as triethylamine, morpholine and piperidine.

Possible solvents for the condensation are: benzene, toluene, xylene, chlorobenzene, tetrachlorethane, dimethylsulphoxide, dimethylformamide and pyridine.

The formylphenylarenooxazoles (VIII) are only known in part. They are appropriately obtained by chromic acid oxidation of the corresponding toluenes. Suitable formyl-phenylarenooxazoles are:

2-(4′-formylphenyl)-benzoxazole,
2-(4′-formalphenyl)-6-methyl-benzoxazole,
2-(4′-formylphenyl)-7-methyl-benzoxazole,
2-(4′-formylphenyl)-6-t-butyl-benzoxazole,
2-(4′-formylphenyl)-6-t-amyl-benzoxazole,
2-(4′-formalphenyl)-6-α,α-dimethyl-benzylbenzoxazole,
2-(4′-formylphenyl)-6-cyclohexyl-benzoxazole,
2-(4′-formylphenyl)-6-chloro-benzoxazole.

EXAMPLES (I) Manufacture of the arenooxazolylstyrylbenztriazoles via the hydroxybenzamides (V) (method A)

Example:

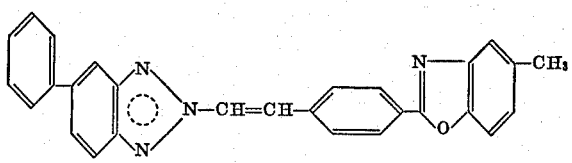

34.1 g. (0.1 mol) of 2-(4'-carboxystyryl)-5-phenyl-benztriazole in 340 ml. of thionyl chloride are heated to the boil for 2 hours in the presence of a few drops of dimethylformamide. Thereafter the excess thionyl chloride is distilled off in vacuo, whereby a light yellow product of melting point 186° is obtained. The acid chloride is taken up in 450 ml. of dry pyridine and stirred for 4 hours at room temperature with 12.3 g. (0.1 mol) of 2-amino-4-methylphenol. Thereafter the mixture is stirred into water, whereby a brown precipitate is produced, which after drying is heated in 750 ml. of xylene in the presence of 2 g. of 4-toluene-sulphonic acid under a water separator until 1.8 ml. of water have been separated off. A yellow product crystallises out from the concentrated xylene solution, and is recrystallised repeatedly from glycol monomethyl ether acetate, using active charcoal. Yield: 11 g., melting point 236–237°, $\lambda_{max.}$ 379 m$\mu$, $\epsilon_{max.}$ 66,800.

The preferred temperature range for the condensation of (VII) with (VIII) extends from 100 to 180° C.

The degrees indicated in the examples which follow are degrees centigrade.

The following compounds are manufactured analogously:

| | Melting point, degrees |
|---|---|
| [structure] | 210–212 |
| [structure] | 226–228 |
| [structure] | 218–220 |
| [structure] | 296–298 |
| [structure] | 280–283 |
| [structure] | 228–229 |

TABLE—Continued

| Structure | Melting point, degrees |
|---|---|
| 5-phenylbenztriazolyl–N–CH=CH–(phenylene)–benzoxazolyl with –C(CH₃)₂–C₆H₅ substituent | 222–224 |
| 5-phenylbenztriazolyl–N–CH=CH–(phenylene)–benzoxazolyl (unsubstituted) | 264–266 |
| 5-phenylbenztriazolyl–N–CH=CH–(phenylene)–benzoxazolyl with –Cl substituent | 270–272 |

The 2-p-carboxystyryl-5-phenylbenztriazole employed as the starting compound can be manufactured as follows:

12.6 g. of 5-phenylbenztriazolyl-(2)-acetic acid are heated for 4 hours to 150° with 8.5 g. of 4-carboxybenzaldehyde in 50 ml. of dimethylformamide in the presence of 4 ml. of piperidine. After cooling, the crystal sludge is filtered off and recrystallised from dimethylformamide and active charcoal. Yield: 9.5 g., melting point 290–298°.

The 5-phenylbenztriazolyl-(2)-acetic acid used as the starting material is manufactured in the manner described in A., 515, 113 (1935). The pure 5-phenylbenztriazolyl-(2)-acetic acid has a melting point of 240° after recrystallisation from glacial acetic acid.

(II) Manufacture of the benzoxazolylstyrylbenztriazoles in polyphosphoric acid (method C)

Example: 34.1 g. (0.1 mol) of 2-(4'-carboxystyryl)-5-phenylbenztriazole and 12.3 g. (0.1 mol) of 2-amino-4-methylphenol in 200 ml. of polyphosphoric acid (84% strength) are heated for 5 hours to 175–180° whilst stirring. After cooling, the mixture is stirred into 1 l. of water and the precipitate is filtered off and washed with water. After repeated recrystallisation from glycol monomethyl ether acetate using active charcoal, 10.5 g. of light yellow crystals of melting point 236–237° are obtained, which are identical (mixed melting point) with the first compound mentioned in Example I.

The remaining compounds described in Example I can be manufactured in the same manner.

(III) Manufacture of the benzoxazolylstyrylbenztriazoles via the o-aminobenzoic acid esters (VI) (method B)

Example: 34.1 g. (0.1 mol) of 2-(4'-carboxystyryl)-5-phenylbenztriazole in 340 ml. of thionyl chloride are heated for 2 hours to the boil in the presence of a few drops of dimethylformamide. Thereafter excess thionyl chloride is distilled off in vacuo, whereby a light yellow acid chloride of melting point 186° is obtained. The product is suspended in 400 ml. of dry xylene and after addition of 12.3 g. (0.1 mol) of 2-amino-4-methylphenol is heated to 110° for 1 hour. After cooling, the product is filtered off and the brownish filter cake is dissolved in 400 ml. of glycol monomethyl ether. This solution is heated to 115–120° for 3 hours with 150 ml. of concentrated hydrochloric acid and 1 g. of tin (II) chloride. The concentrated solution deposits a yellow-brown product which after the customary purification yields 9.5 g. of light yellow crystals of melting point 237° C. and is identical (mixed melting point) with the first compound mentioned in Example 1.

The remaining compounds described in Example 1 can be prepared in the same manner.

(IV) Manufacture of the benzoxazolylstyrylbenztriazoles by reaction of the acetic acids (VII) with the aldehydes (VIII)

34.1 g. (0.1 mol) of 2-(4'-carboxystyryl)-5-phenylbenztriazolyl acetic acid and 23.7 g. (0.1 mol) of 5-methyl-2-(p-formylphenyl)-benzoxazole in 500 ml. of dimethylformamide are heated for 6 hours under reflux in the presence of 20 ml. of piperidine. 17.5 g. of brown-yellow crystals crystallise from the concentrated solution, and after recrystallisation from glycol monomethyl ether acetate melt at 235–237 C. (no melting point depression with the first compound mentioned in Example 1).

(V) Use (a) A spinning solution of 1 kg. of cellulose acetate in 4 l. of acetone, manufactured in the customary manner, is mixed with a solution of 1.5 g. of 2-[p-5'-methylbenzoxazolyl-(2')-styryl]-5-phenyl-benztriazole in acetone and spun in a known manner. The resulting filaments show good light-fast brightening.

(b) 65 g. of polyvinyl chloride with a K-value of 72–74, 35 g. of dioctyl phthalate, 2 g. of a commercially available organic stabliser containing tin, 1 g. of titanium dioxide (rutile) and 0.1 g. of 2-[p-5'-methylbenzoxazolyl-(2')-styryl]-5-phenyl-benztriazole are milled for 5 minutes on a hot mill with low friction at about 165–170°; the resulting hide is then drawn down to a film of 300μ in a four-bowl calender. The film shows good brightening.

(c) 1 g. of 2-[p-5'-methylbenzoxazolyl-(2')-styryl]-5-phenyl-benztriazole is dissolved in 1000 g. of a colourless lacquer of nitrocellulose or cellulose actate. The lacquer is then brushed out thinly on a colourless substrate. After drying, the lacquer layer shows excellent brightening.

(d) A mixture of 100 g. of polyester granules of terephthalic acid ethylene glycol polyester and 0.05 g. of 2-[p-5'-methyl-benzoxazolyl - (2') - styryl]-5-phenylbenztriazole is heated to 285° and the melt is spun into filaments which show good brightening.

(e) A mixture of 100 g. of polyamide and 0.05 g. of 2-[p-5'-methyl-benzoxazolyl - (2') - styryl]-5-phenylbenztriazole is heated to 300° C. over the course of 30 minutes and spun into filaments in the usual manner. The material obtained in this manner shows good light-fast brightening.

(f) A mixture of 100 g. of polypropylene and 0.5 g. of 2-[p-5'-methyl-benzoxazolyl-(2')-styryl]-5-phenylbenztriazole is heated to 280–290° and the melt is spun according to known processes into filaments which show good light-fast brightening.

(g) Polypropylene fibres are heated for 45 minutes to the boil in a treatment bath which contains 0.5 g. of 2-[p-5'-methylbenzoxazolyl - (2') - styryl]-5-phenylbenztriazole and 10 g. of a surface-active agent of the alkylbenzenesulphonic acid type and has a liquor ratio of 1:40. After the usual rinsing, the fibres show a distinct brightening effect which displays good light fastness.

What is claimed is:
1. 2-[4'-(benzoxazolyl-2")-styryl]-5-arylbenztriazole of the formula

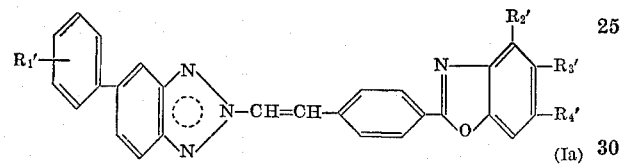

in which
R₁' represents hydrogen, halogen, an alkyl, alkenyl or alkoxy radical each with 1 to 5 carbon atoms, or phenyl, and
each of R₂', R₃' and R₄' represents hydrogen, halogen an alkyl, alkenyl or alkoxy radical with 1 to 4 carbon atoms, a cycloalkyl radical with 5 to 6 carbon atoms, a phenylalkyl radical with 1 to 4 carbon atoms in the alkyl radical, or a phenyl radical, or
R₂' and R₃' conjointly form a benzene ring.

2. Styryl compound according to claim 1 of the formula

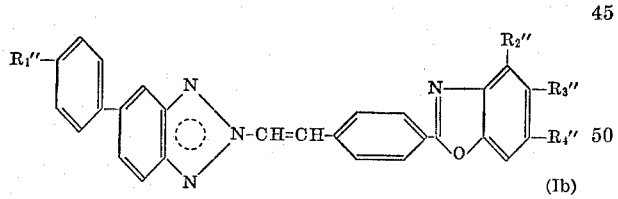

in which
R₁" denotes hydrogen or chlorine, and each of R₂", R₃" and R₄" represents hydrogen, methyl, t-butyl, benzyl, phenylisopropyl or phenyl or
R₂" and R₃" together form a benzene ring.

3. Styryl compound of formula

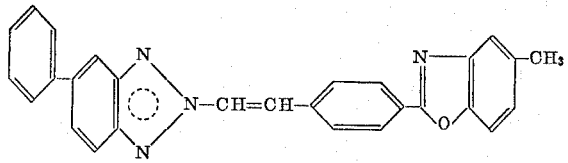

4. Styryl compound of formula

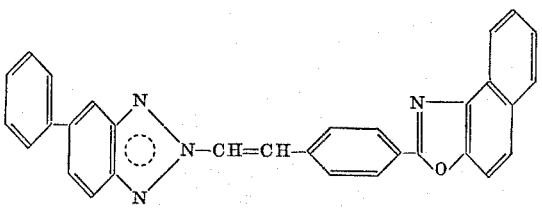

5. Styryl compound of formula

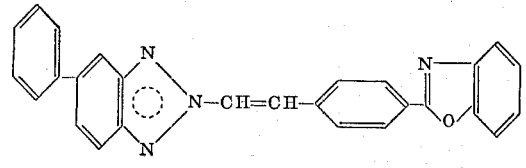

6. Styryl compound of formula

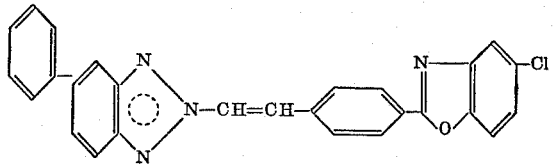

References Cited
UNITED STATES PATENTS

| | | | |
|---|---|---|---|
| 3,401,048 | 9/1968 | Okubo et al. | 260—240 D X |
| 3,505,318 | 4/1970 | Schellhammer et al. | 260—240 D |
| 3,595,859 | 7/1971 | Schellhammer et al | 260—240 D |

JOHN D. RANDOLPH, Primary Examiner

U.S. Cl. X.R.

106—176; 252—301.2 W; 260—75 N, 78 R, 92.8 A, 93.7